D. E. ROHR.
Seed Planter.

No. 7,845.

Patented Dec. 17, 1850.

UNITED STATES PATENT OFFICE.

DAVID E. ROHR, OF CHARLESTOWN, VIRGINIA.

IMPROVEMENT IN OSCILLATING SEEDING-CYLINDERS.

Specification forming part of Letters Patent No. 7,845, dated December 17, 1850.

*To all whom it may concern:*

Be it known that I, DAVID E. ROHR, of Charlestown, in the county of Jefferson and State of Virginia, have invented certain new and useful Improvements in Seeding-Machines; and I do hereby declare the following to be a full and clear description thereof, reference being had to the annexed drawings, constituting part of this specification.

Figure 1:
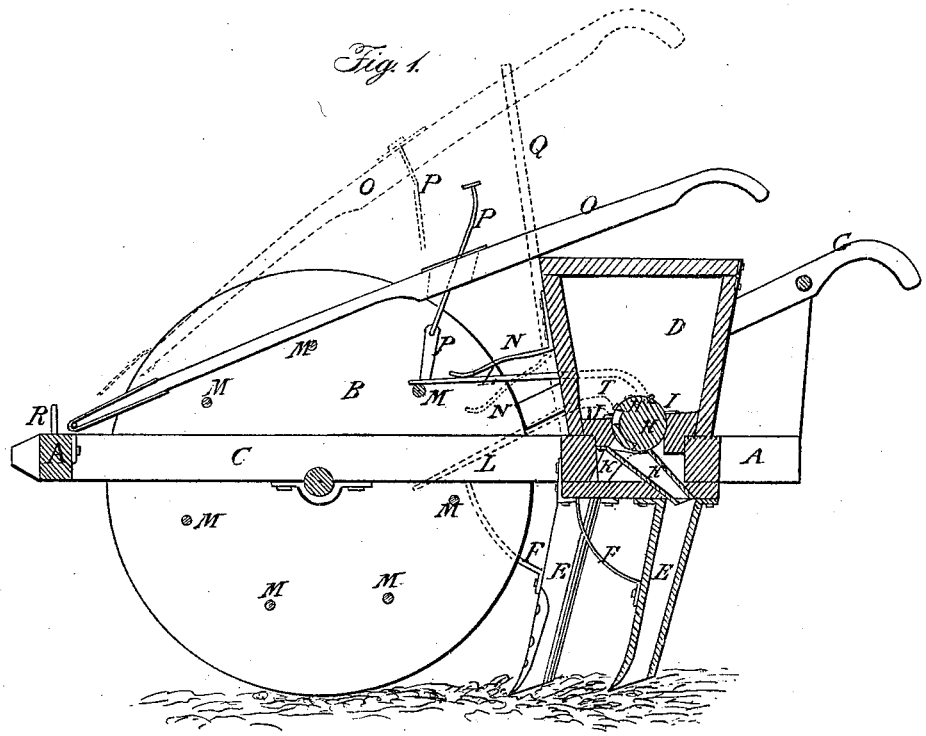
Figure 2:
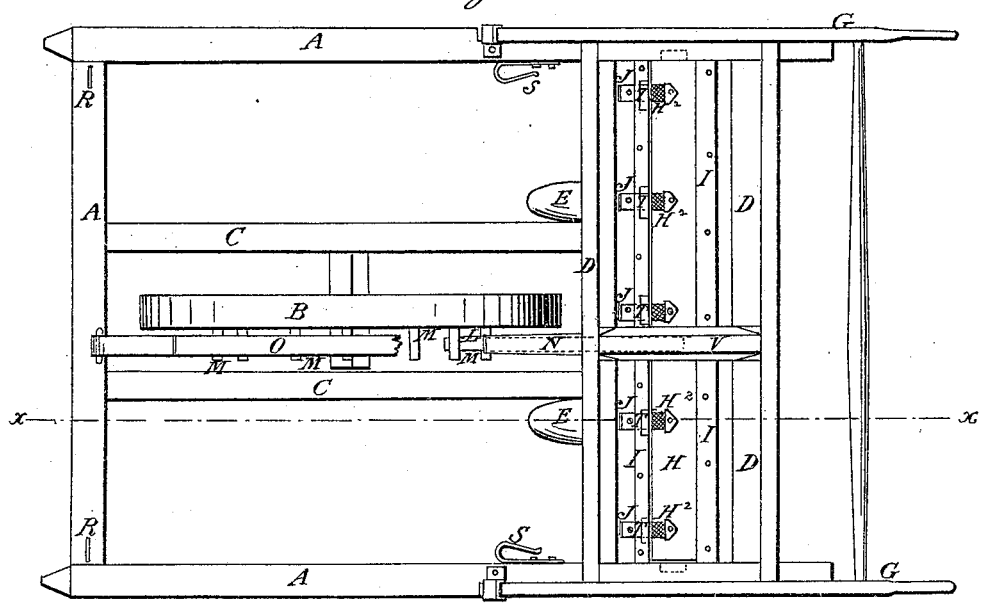

Figure 1 represents a vertical longitudinal section through the machine at the dotted line $x\ x$ of Fig. 2, showing one of the cells or cavities receiving seed from the hopper. Fig. 2 is a plan or top view of the same, the lid of the seed-hopper being removed in order to show the oscillating cylinder and regulating-slides.

The letters on the two figures refer to like parts.

My improvements relate to an oscillating or rocking shaft or cylinder provided with suitable cavities or cells to receive the seed, and arranged within the bottom of the seed-hopper, and actuated by pins projecting from the side of the supporting and propelling wheel, by the rotation of which the pins are made to strike the end of a bar or trip-lever projecting from the oscillating cylinder and lift the same, so as to bring the cavities or cells in said cylinder upward to receive a supply of seed, when the projecting bar or trip-lever is relieved and thrown suddenly downward by means of a spring or its equivalent, which moves the cylinder upon its axis in the same direction and discharges the seed from the cells or cavities therein.

A is the frame.

B is the supporting and propelling wheel, arranged in front of the hopper, and having its bearings in two timbers, C C.

D is the hopper.

E are the drill-teeth or depositing-tubes, arranged alternately in front of each other, and attached permanently to the bottom board of the hopper and firmly braced by curved braces F.

G are the handles for steadying and guiding the machine.

H is the oscillating seeding-cylinder, having its bearings in the lower part of the hopper, and provided with a row of cavities or cells, $H^2$, parallel with its axis, to receive and discharge the seed alternately.

I I are plates or guards secured on either side of the oscillating cylinder H, and parallel to the same, and form a portion of the bottom of the hopper, upon which the seed rests to prevent it passing between the periphery of the cylinder and sides of the hopper.

J J are slides placed beneath the guard-plate I directly opposite to each cavity or seed-cell $H^2$, and secured by screw-bolts passed through slots therein, which allow of their movement into or from the cavities or cells, and thus regulate the discharge of the seed, there being pieces of leather T placed on the plate I above said slides, to prevent the seed being broken by the guard-plate while the filled cells or cavities are passing below the same to discharge the seed.

K K are spouts attached to the bottom board of the hopper beneath the oscillating cylinder, for conducting the seed, as it is discharged from the cells or cavities, through openings in the bottom board and into the drill-teeth or depositing-tubes.

L is an arm or trip-lever attached to the center of the oscillating cylinder, and projecting through an opening in the front side of the hopper in a position to be struck by a series of pins, M, projecting from the side of the propelling-wheel equidistant from its center, for elevating the same and moving the cylinder on its axis upward to receive a supply of seed from the hopper.

N is a spring secured to the hopper, and extending outward directly over the end of the arm or lever L, so that when said arm shall have been elevated and liberated from the pins M the elastic force of the spring N will force the arm L downward, and thus discharge the seed from all the cavities or cells simultaneously, the position of the spring N and arm L, when liberated from the pin M, and one of the seed-cells when in a position to discharge the seed being represented by dotted lines in Fig. 1.

O is a lever attached to the front beam of the frame and extending rearward over the hopper, and connected with the end of the arm L by a jointed rod, P, the upper part of which is made to play loosely in an opening in the lever O, for allowing the due operation of the arm L, and by which said arm is suspended from the action of the pins M, and thus stop the oscillation or rocking of the cylinder by raising the lever O over the end of a prop, Q, mounted on the hopper, as seen by the dotted lines in Fig. 1.

The animals for drawing the machine are attached to the hooks R S between the side timbers of the frame and on either side of the propelling-wheel.

The arm or lever L is made to rise and fall with the motion of the oscillating cylinder in a space inside of the division V of the hopper, and thus afford no escape for the seed. The spring N should be sufficiently strong to produce the required jar for effectually discharging the seed from the cavities in the cylinder.

Having thus described my improvements in the seeding-machine, what I claim as new and of my invention, and desire to secure by Letters Patent, is—

Oscillating the seeding-cylinder H upon its axis for the supply and discharge of the seed, as described, by means of the combination of the lever L, spring N, and pins M with the propelling-wheel B, as described.

In testimony whereof I have hereunto signed my name before two subscribing witnesses.

DAVID E. ROHR.

Witnesses:
   THOS. G. RAWLINS,
   JOS. C. RAWLINS.